(12) United States Patent
Prince et al.

(10) Patent No.: US 10,639,571 B2
(45) Date of Patent: May 5, 2020

(54) WATER FILTER ASSEMBLY

(71) Applicant: Haier US Appliance Solutions, Inc., Wilmington, DE (US)

(72) Inventors: Ryan John Prince, Louisville, KY (US); Gregory Sergeevich Chernov, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 236 days.

(21) Appl. No.: 15/859,798

(22) Filed: Jan. 2, 2018

(65) Prior Publication Data

US 2019/0201821 A1    Jul. 4, 2019

(51) Int. Cl.

| B01D 35/30 | (2006.01) |
|---|---|
| E03B 7/07 | (2006.01) |
| B01D 35/02 | (2006.01) |
| C02F 1/00 | (2006.01) |
| C02F 1/28 | (2006.01) |
| C02F 1/44 | (2006.01) |
| C02F 101/12 | (2006.01) |
| C02F 101/20 | (2006.01) |
| C02F 101/10 | (2006.01) |
| C02F 101/30 | (2006.01) |

(52) U.S. Cl.
CPC .......... B01D 35/306 (2013.01); B01D 35/02 (2013.01); C02F 1/001 (2013.01); E03B 7/074 (2013.01); B01D 2201/302 (2013.01); B01D 2201/34 (2013.01); B01D 2201/50 (2013.01); C02F 1/281 (2013.01); C02F 1/283 (2013.01); C02F 1/441 (2013.01); C02F 2101/103 (2013.01); C02F 2101/12 (2013.01); C02F 2101/20 (2013.01); C02F 2101/305 (2013.01); C02F 2201/004 (2013.01); C02F 2307/14 (2013.01)

(58) Field of Classification Search
None
See application file for complete search history.

(56) References Cited

U.S. PATENT DOCUMENTS

| 3,213,187 | A | * | 10/1965 | Kish | F16L 21/04 |
|---|---|---|---|---|---|
| | | | | | 174/84 S |
| 3,860,742 | A | * | 1/1975 | Medney | F16L 25/01 |
| | | | | | 174/84 S |
| 3,926,815 | A | * | 12/1975 | McClory | B01D 35/043 |
| | | | | | 210/424 |
| 4,538,841 | A | * | 9/1985 | Royston | F16L 21/04 |
| | | | | | 285/337 |
| 5,607,192 | A | | 3/1997 | Lee | |
| 7,077,955 | B1 | * | 7/2006 | Lin | B01D 35/30 |
| | | | | | 210/232 |
| 2017/0002962 | A1 | * | 1/2017 | Corne | F16L 19/075 |

* cited by examiner

*Primary Examiner* — Krishnan S Menon
(74) *Attorney, Agent, or Firm* — Dority & Manning, P.A.

(57) ABSTRACT

A water filter assembly includes a manifold mountable to a water conduit. An end of the water conduit is receivable between a manifold body and a mounting clamp of the manifold. A fastener is configured for drawing the manifold body and the mounting clamp together in order to clamp the water conduit to the manifold. A face seal is configured to be compressed between the manifold body and the mounting clamp when the fastener draws the manifold body and the mounting clamp together. An O-ring is positionable on the water conduit such that the O-ring extends between an inner surface of the manifold body and an inner surface of the mounting clamp.

17 Claims, 3 Drawing Sheets

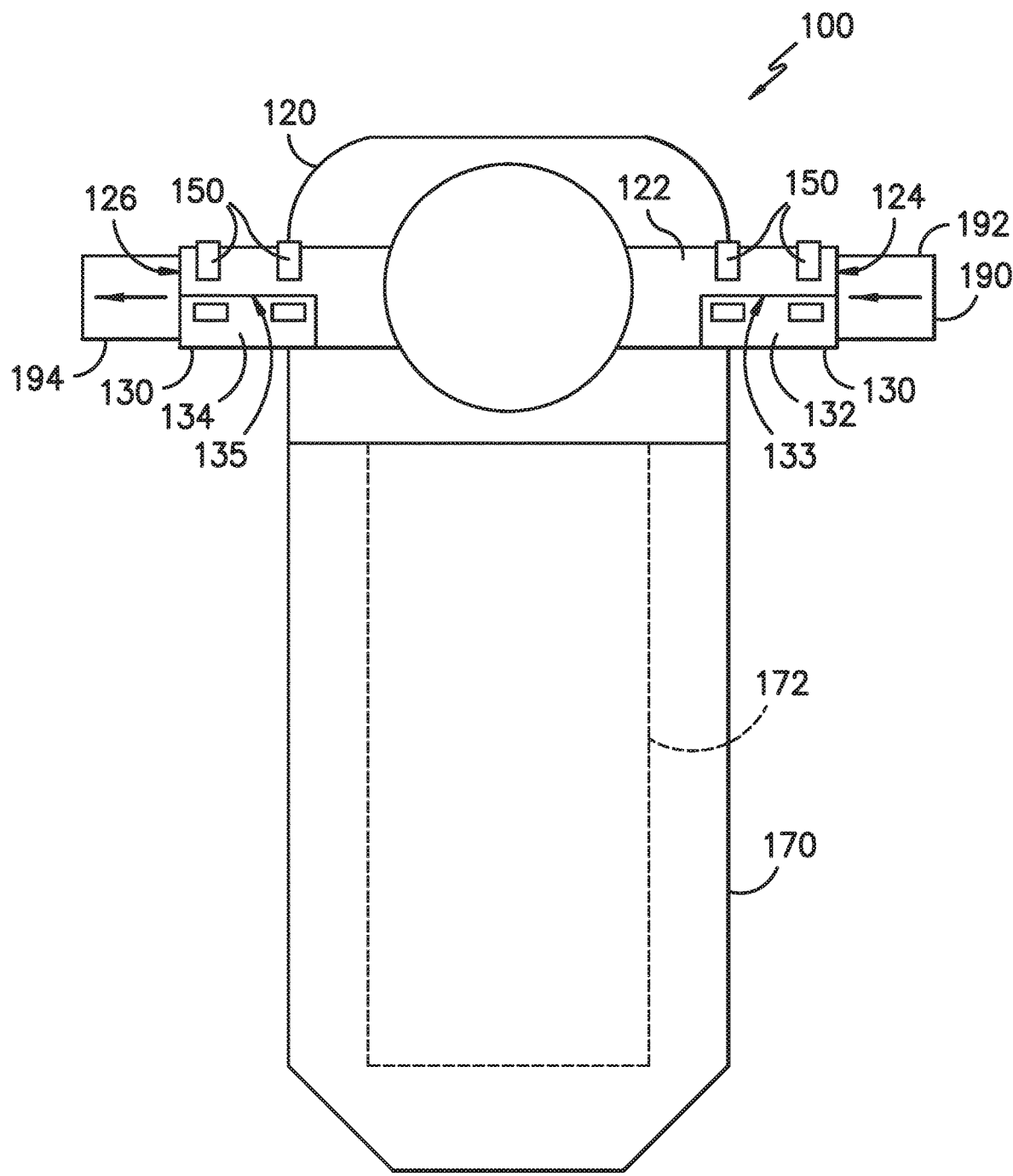
FIG. -1-

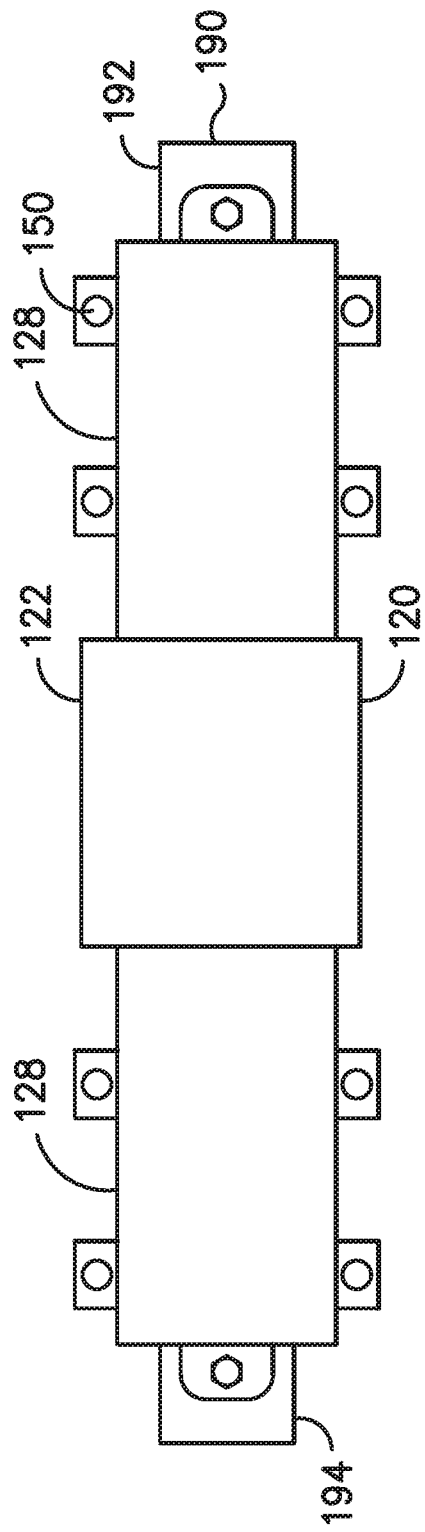
FIG. -2-
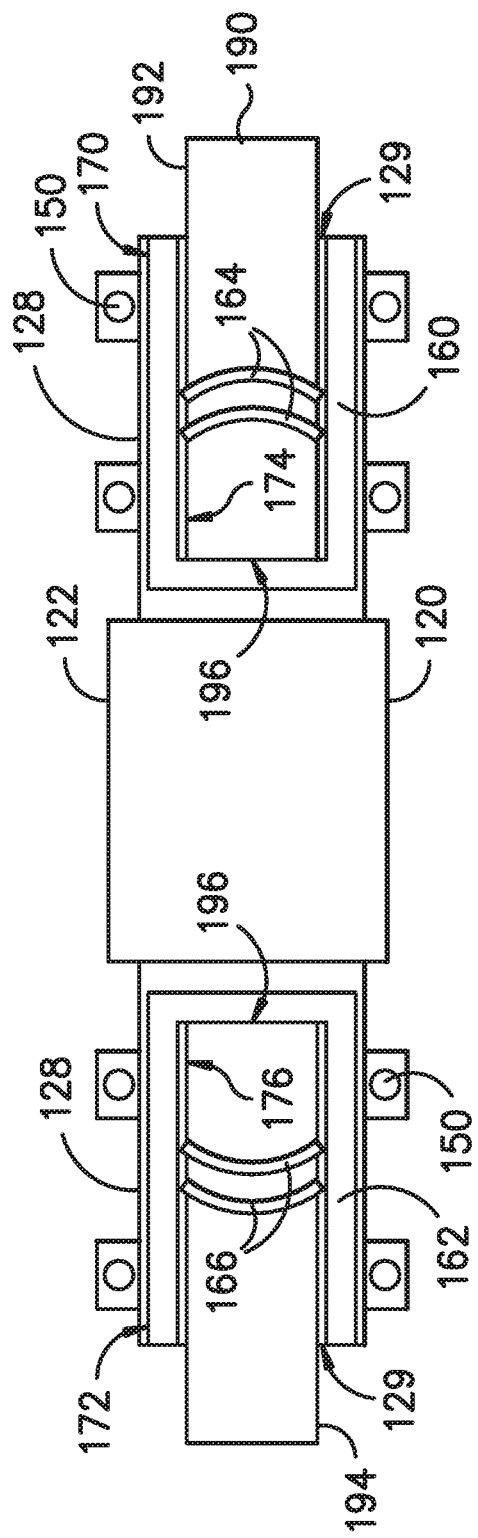
FIG. -3-

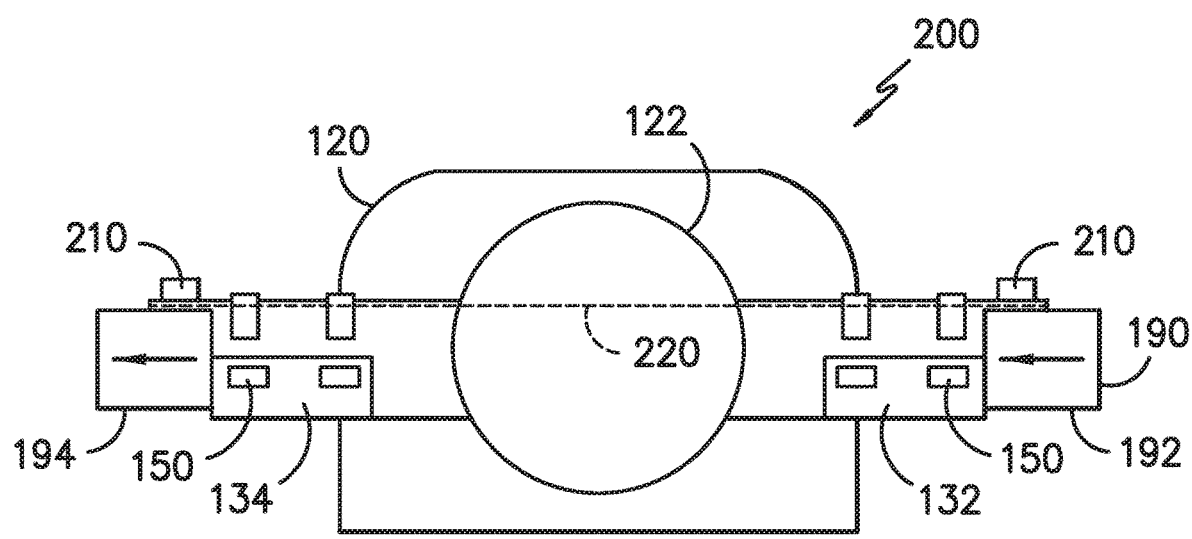
FIG. -4-

WATER FILTER ASSEMBLY

FIELD OF THE INVENTION

The present subject matter relates generally to water filters, such as point of entry water filters.

BACKGROUND OF THE INVENTION

Water filters are generally divided into two classes: point of entry water filters and point of use water filters. Point of entry water filters can be installed on a water line in order to filter water flowing through the water line into a building or residence. Thus, point of entry water filters can provide filtered water throughout the building or residence.

Installing point of entry water filters on the water line can be difficult, and a homeowner may lack the skillset necessary to install point of entry water filters. Frequently, a plumber is hired to install point of entry water filters, and an overall cost of point of entry water filters is thereby increased. Quick connect fittings have gained popularity in recent years and attempt to reduce the complexity associated within point of entry water filter installation. However, quick connect fittings generally do not allow an installer to simply cut a pipe and insert a manifold at the cutout.

BRIEF DESCRIPTION OF THE INVENTION

The present subject matter provides a water filter assembly with a manifold mountable to a water conduit. An end of the water conduit is receivable between a manifold body and a mounting clamp of the manifold. A fastener is configured for drawing the manifold body and the mounting clamp together in order to clamp the water conduit to the manifold. A face seal is configured to be compressed between the manifold body and the mounting clamp when the fastener draws the manifold body and the mounting clamp together. An O-ring is positionable on the water conduit such that the O-ring extends between an inner surface of the manifold body and an inner surface of the mounting clamp. Additional aspects and advantages of the invention will be set forth in part in the following description, or may be apparent from the description, or may be learned through practice of the invention.

In a first example embodiment, a water filter assembly includes a manifold mountable to a water conduit. The manifold includes a manifold body and a mounting clamp. The mounting clamp is selectively mounted to the manifold body. An end of the water conduit is receivable between the manifold body and the mounting clamp. The manifold also includes a fastener, a face seal and an O-ring. The fastener couples the mounting clamp to the manifold body. The fastener is configured for drawing the manifold body and the mounting clamp together in order to clamp the water conduit to the manifold. The face seal extends along an interface between the manifold body and the mounting clamp. The face seal is configured to be compressed between the manifold body and the mounting clamp when the fastener draws the manifold body and the mounting clamp together. The O-ring is positionable on the water conduit such that the O-ring extends between an inner surface of the manifold body and an inner surface of the mounting clamp. A casing is selectively mountable to the manifold. The casing is sized for receipt of a filter media that filters water flowing through the manifold.

In a second example embodiment, a water filter assembly is provided. The water filter assembly includes a manifold mountable to a water conduit at a cutout of the water conduit. The water conduit has a pair of spaced ends at the cutout. The manifold is mountable between the pair of spaced ends. The manifold includes a manifold body, a first mounting clamp and a second mounting clamp. The first mounting clamp is selectively mounted to the manifold body. One of the pair of spaced ends is receivable between the manifold body and the first mounting clamp. The second mounting clamp is also selectively mounted to the manifold body. The other end of the pair of spaced ends is receivable between the manifold body and the second mounting clamp. A plurality of fasteners couples the first and second mounting clamps to the manifold body. A first face seal extends along an interface between the manifold body and the first mounting clamp. The first face seal is configured to be compressed between the manifold body and the first mounting clamp when fasteners of the plurality of fasteners draw the manifold body and the first mounting clamp together. A second face seal extends along an interface between the manifold body and the second mounting clamp. The second face seal is configured to be compressed between the manifold body and the second mounting clamp when fasteners of the plurality of fasteners draw the manifold body and the second mounting clamp together. A first pair of O-rings is positionable on the water conduit at the one end of the pair of spaced ends such that the first pair of O-rings extends between an inner surface of the manifold body and an inner surface of the first mounting clamp. A second pair of O-rings is positionable on the water conduit at the other end of the pair of spaced ends such that the second pair of O-rings extends between the inner surface of the manifold body and an inner surface of the second mounting clamp. A casing is selectively mountable to the manifold. The casing is sized for receipt of a filter media that filters water flowing through the manifold.

In a third example embodiment, a water filter assembly is provided. The water filter assembly includes a manifold mountable to a water conduit at a cutout of the water conduit. The water conduit has a pair of spaced ends at the cutout. The manifold is mountable between the pair of spaced ends. The manifold includes a manifold body. A pair of grounding connectors is mounted to the manifold body at opposite ends of the manifold body. One of the pair of grounding connectors is configured to contact the water conduit at the one end of the pair of spaced ends. The other of the pair of grounding connectors is configured to contact the water conduit at the other end of the pair of spaced ends. A conductor is disposed within the manifold body. The conductor extends between the pair of grounding connectors within the manifold body such that the pair of grounding connectors is electrically coupled to each other with the conductor. A casing is selectively mountable to the manifold. The casing is sized for receipt of a filter media that filters water flowing through the manifold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 is a front, elevation view of a water filter assembly according to an example embodiment of the present subject matter.

FIG. 2 is a top, plan view of certain components of the example water filter assembly of FIG. 1.

FIG. 3 is a bottom, plan view of certain components of the example water filter assembly of FIG. 1.

FIG. 4 provides a front, elevation view of a manifold for the water filter assembly according to another example embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, elevation view of a water filter assembly 100 according to an example embodiment of the present subject matter. Water filtering assembly 100 is configured for selectively filtering water coming into a building or residence from a water supply, such as a municipal water source or a well. Water filtering assembly 100 can remove contaminants such as chlorine, chloroform, lead, arsenic, pharmaceuticals, microbes, and/or other undesirable substances from water flowing therethrough. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances. Water filtering assembly 100 can be installed at any suitable location within the building or residence. For example, water filter assembly 100 may be installed beneath a sink or within a basement, supply closet, etc.

Water filtering assembly 100 includes a manifold 120 and a casing 170. Manifold 120 includes a body 122 and mounting clamps 130. Body 122 and mounting clamps 130 define an inlet conduit 124 and an outlet conduit 126. In particular, body 122 and a first mounting clamp 132 may form inlet conduit 124 when first mounting clamp 132 is mounted to body 122, and body 122 and a second mounting clamp 134 may form outlet conduit 126 when second mounting clamp 134 is mounted to body 122. Inlet and outlet conduits 124, 126 may be positioned or formed at opposite sides of manifold 120.

Inlet conduit 124 may be in fluid communication with a water supply via an inlet pipe 192 and receive unfiltered water from the water supply. From inlet conduit 124, such unfiltered water is directed through manifold 120 into casing 170. Such unfiltered water passes through a filter medium 172 within casing 170 and exits casing 170 through manifold 120 to outlet conduit 126 as filtered water. From outlet conduit 126, such filtered water exits manifold 120 via outlet pipe 194. Such filtered water may, e.g., be directed to an ice maker or dispenser of a refrigerator appliance, a kitchen sink faucet, and/or any other suitable outlet via outlet pipe 194.

Filter medium 172 is disposed within an interior volume of casing 170. Filter medium 172 can remove impurities and contaminants from water passing through filter medium 172. Filter medium 172 may include any suitable mechanism for filtering water such as, e.g., ceramic filters, activated carbon filters, polymer filters, reverse osmosis filters, etc. Casing 170 is removably mounted, e.g., threaded or otherwise mechanically attached, to body 122 of manifold 120. Thus, e.g., filter medium 172 may be serviced or changed as needed. Casing 170 may be a component of a filter cartridge in certain example embodiments.

As an example, water passing though water filtering assembly 100 can follow a path through water filtering assembly 100. In particular, unfiltered water can enter water filtering assembly 100 through inlet conduit 124. Such unfiltered water can then flow into casing 170. Such unfiltered water can pass though filter medium 172 to remove impurities and can exit filter medium 172 as filtered water. Such filtered water can then exit water filtering assembly 100 through outlet conduit 126. In such a manner, unfiltered water can follow the path through water filtering assembly 100. In particular, unfiltered water can pass though filter medium 172, and filtered water can exit water filtering assembly 100. Such filtering can improve taste and/or safety of water.

FIG. 2 is a top, plan view of certain components of water filter assembly 100, and FIG. 3 is a bottom, plan view of certain components of water filter assembly 100. As discussed in greater detail below with reference to FIGS. 2 and 3, water filter assembly 100 includes features for coupling manifold 120 to a water conduit 190, such as a copper, PVC or PEX pipe. In particular, water filter assembly 100 includes features for quickly and/or easily coupling manifold 120 to water conduit 190, e.g., such that a homeowner can install water filter assembly 100 on water conduit 190.

It will be understood that prior to installing water filter assembly 100 on water conduit 190, water conduit 190 may be continuous between inlet pipe 192 and outlet pipe 194. Thus, inlet pipe 192 and outlet pipe 194 may be formed when the installer cuts water conduit 190 and removes the cutout section of water conduit 190. After cutting water conduit 190, water conduit 190 may have a pair of spaced ends 196. Inlet pipe 192 may include one of spaced ends 196, and outlet pipe 194 may include the other of spaced ends 196. Manifold 120 is mountable to water conduit 190 between spaced ends 196. Thus, manifold 120 may rejoin and form a flow path between inlet and outlet pipes 192, 194, in the manner described above.

Body 122 of manifold 120 may be sized such that body 122 is configured to hang on inlet and outlet pipes 192, 194 at spaced ends 196. In particular, body 122 of manifold 120 may include a pair of projections 128 that each has a passage 129 that is shaped complementary to inlet and outlet pipes 192, 194. Thus, the installer may position inlet and outlet pipes 192, 194 within passages 129 of projections 128, and projections 128 of body 122 may rest on inlet and outlet pipes 192, 194. Thus, body 122 of manifold 120 may hang from inlet and outlet pipes 192, 194 after cutting water conduit 190 in order to facilitate installation of manifold 120 on water conduit 190.

Turning back to FIG. 1, manifold 120 includes mounting clamps 130. Body 122 and mounting clamps 130 may cooperate to clamp manifold 120 to water conduit 190. In particular, inlet and outlet pipes 192, 194 may be clamped to body 122 with mounting clamps 130. Thus, the installer may attach mounting clamps 130 to body 122 in order to mount manifold 120 on water conduit 190.

Mounting clamps 130 may include a first mounting clamp 132 and a second mounting clamp 134. First and second mounting clamps 132, 134 are selectively mounted to body 122, e.g., at opposite ends of body 122. In particular, one of spaced ends 196 is received between body 122 and first mounting clamp 132, e.g., when inlet pipe 192 is positioned between body 122 and first mounting clamp 132. Similarly, the other of spaced ends 196 is received between body 122 and second mounting clamp 134, e.g., when outlet pipe 194 is positioned between body 122 and second mounting clamp 134. Thus, first and second mounting clamps 132, 134 may be attached to body 122 in order to connect manifold 120 on water conduit 190.

A plurality of fasteners 150 selectively couple mounting clamps 130 to body 122. For example, fasteners 150 may extend through body 122 and mounting clamps 130 in order to couple mounting clamps 130 to body 122. In certain example embodiments, fasteners 150 may be screws as shown in FIG. 1, and either body 122 or mounting clamps 130 may define threaded holes for engaging with the screws. In alternative embodiments, fasteners 150 may be latches, clips, pins, etc. As fasteners 150 are tightened, cinched, etc., fasteners 150 draw mounting clamps 130 against body 122.

As discussed above, fasteners 150 couple mounting clamps 130 to body 122. In the example embodiment shown in FIGS. 2 and 3, multiple fasteners 150 are used to couple each one of mounting clamps 130 to body 122. However, water filter assembly 100 may include other features for coupling mounting clamps 130 to body 122. For example, one side of mounting clamps 130 may be coupled to body 122 with a hinge, e.g., a living hinge formed between mounting clamps 130 and body 122. One or more fasteners 150 may be used to couple the opposite side of mounting clamps 130 to body 122 in such example embodiments.

Manifold 120 also includes features for sealing the interface or joint between the body 122 and mounting clamps 130. In particular, manifold 120 may include a first face seal 160, a second face seal 162, a first pair of O-rings 164 and a second pair of O-rings 166. First face seal 160 is positioned at and extends along the interface between body 122 and first mounting clamp 132. First face seal 160 is configured to be compressed between body 122 and first mounting clamp 132 when fasteners 150 draw body 122 and first mounting clamp 132 together. First face seal 160 may be mounted to (e.g., adhered, bonded, etc.) to one of body 122 or first mounting clamp 132, and the other of body 122 or first mounting clamp 132 may define a knife edge seal that engages first face seal 160 to assist with forming a tight seal between body 122 and first mounting clamp 132.

The interface between body 122 and first mounting clamp 132 may include and/or be formed by a first surface 170 of body 122 and an engagement surface 133 of first mounting clamp 132. First surface 170 of body 122 and engagement surface 133 of first mounting clamp 132 may be positioned at and face each other when first mounting clamp 132 is mounted to body 122. The first surface 170 of body 122 may also be shaped complementary to engagement surface 133 of first mounting clamp 132 in order to limit (e.g., minimize) the gap between first surface 170 of body 122 and engagement surface 133 of first mounting clamp 132.

Second face seal 162 is positioned at and extends along the interface between body 122 and second mounting clamp 134. Second face seal 162 is configured to be compressed between body 122 and second mounting clamp 134 when fasteners 150 draw body 122 and second mounting clamp 134 together. Second face seal 162 may be mounted to (e.g., adhered, bonded, etc.) to one of body 122 or second mounting clamp 134, and the other of body 122 or second mounting clamp 134 may define a knife edge seal that engages second face seal 162 to assist with forming a tight seal between body 122 and second mounting clamp 134.

The interface between body 122 and second mounting clamp 134 may include and/or be formed by a second surface 172 of body 122 and an engagement surface 135 of second mounting clamp 134. Second surface 172 of body 122 and engagement surface 135 of second mounting clamp 134 may be positioned at and face each other when second mounting clamp 134 is mounted to body 122. The second surface 172 of body 122 may also be shaped complementary to engagement surface 135 of second mounting clamp 134 in order to limit (e.g., minimize) the gap between second surface 172 of body 122 and engagement surface 135 of second mounting clamp 134.

First pair of O-rings 164 may be positioned on water conduit 190, e.g., at one of spaced ends 196. In particular, the installer may position first pair of O-rings 164 on water conduit 190 prior to attaching first mounting clamp 132 to body 122. With first pair of O-rings 164 positioned on water conduit 190, first pair of O-rings 164 may extend between an inner surface 174 of body 122 and an inner surface of first mounting clamp 132 after the installer attaches first mounting clamp 132 to body 122. First pair of O-rings 164 may extend radially from water conduit 190 to first mounting clamp 132 and body 122 in order to fill the radial gap between water conduit 190 and first mounting clamp 132/body 122. First pair of O-rings 164 may contact first face seal 160 at the interface between body 122 and first mounting clamp 132.

Second pair of O-rings 164 may be positioned on water conduit 190, e.g., at the other end of spaced ends 196 opposite first pair of O-rings 164. In particular, the installer may position second pair of O-rings 166 on water conduit 190 prior to attaching second mounting clamp 134 to body 122. With second pair of O-rings 166 positioned on water conduit 190, second pair of O-rings 166 may extend between an inner surface 176 of body 122 and an inner surface of second mounting clamp 134 after the installer attaches second mounting clamp 134 to body 122. Second pair of O-rings 166 may extend radially from water conduit 190 to second mounting clamp 134 and body 122 in order to fill the radial gap between water conduit 190 and second mounting clamp 134/body 122. Second pair of O-rings 166 may contact second face seal 162 at the interface between body 122 and second mounting clamp 134.

As may be seen from the above, water filter assembly 100 includes features for clamping manifold 120 to water conduit 190. Thus, water conduit 190 may be simply cut, and manifold 120 clamped to water conduit 190 at the cutout in order to install water filter assembly 100 on water conduit 190. In such a manner, water filter assembly 100 may be easily and/or quickly installed on water conduit 190. Such features may allow a homeowner to install the water filter assembly 100 on water conduit 190.

FIG. 4 provides a front, elevation view of a manifold 200 for water filter assembly 100 according to another example embodiment of the present subject matter. Manifold 200 includes numerous common components with manifold 120. However, manifold 200 also includes a pair of grounding screws 210 and a conductor 220. Grounding screws 210 are threaded to body 122. Grounding screws 210 may also be positioned at opposite ends of body 122. One of grounding screws 210 is configured to contact water conduit 190 at one end of spaced ends 196, and the other of grounding screws 210 is configured to contact water conduit 190 at the other end of spaced ends 196. Conductor 220 extends between grounding screws 210. In particular, conductor 220 electrically couples grounding screws 210, e.g., in order to bridge the cutout between spaced ends 196 and ground the two sections of water conduit 190. It will be understood that manifold 200 may include other mechanisms for connecting conductor 220 to water conduit 190, such as pins, posts, etc. that contact water conduit 190.

Conductor 220 may be encased within body 122. For example, conductor 220 may be a metal conductor and body 122 may be a plastic manifold body. The metal conductor 220 may be overmolded within the plastic manifold body 122. In particular, metal conductor 220 may be a metal trace or wire within body 122. Such positioning of conductor 220 may allow grounding of water conduit 190 without a separate external wire. Thus, water conduit 190 may be grounded by simply compressing grounding screws 210 onto the two sections of water conduits 190.

The grounding path between grounding screws 210 via conductor 220 may be checked with on-board electronics. In particular, the capacitance of the connection on each side of the water conduit 190 may be measured. An initial capacitance of the connection may be compared to the substantially increased capacitance on either side of the circuit to ensure the electrical connection is properly made. The continuity check serves as a verification that both sides of the water conduit 190 are fully engaged by the grounding screws 210 during the installation process.

While described above in the context of a water filter manifold, the present subject matter may be used to bridge spaced ends 196 of water conduit 190 for other purposes. For example, the present subject may be used as a patch between spaced ends 196 of water conduit 190. Thus, body 122 may be a simple conduit for flowing water between spaced ends 196 of water conduit 190. As another example, the present subject may be used as a mounting for a sensor, such as a flowmeter, water sensor, temperature sensor, etc., between spaced ends 196 of water conduit 190. Thus, a sensor may be mounted to body 122 for measuring the flow of water between spaced ends 196 of water conduit 190.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly, comprising:
 a manifold mountable to a water conduit, the manifold comprising
  a manifold body;
  a mounting clamp selectively mounted to the manifold body, an end of the water conduit receivable between the manifold body and the mounting clamp;
  a fastener for coupling the mounting clamp to the manifold body, the fastener configured for drawing the manifold body and the mounting clamp together in order to clamp the water conduit to the manifold;
  a face seal that extends along an interface between the manifold body and the mounting clamp, the face seal configured to be compressed between the manifold body and the mounting clamp when the fastener draws the manifold body and the mounting clamp together; and
  an O-ring positionable on the water conduit such that the O-ring extends between an inner surface of the manifold body and an inner surface of the mounting clamp; and
 a casing selectively mountable to the manifold, the casing sized for receipt of a filter media that filters water flowing through the manifold.

2. The water filter assembly of claim 1, wherein the fastener is a screw, and one of the mounting clamp and the manifold body define a threaded hole for engaging with the screw.

3. The water filter assembly of claim 1, wherein the manifold further comprises a pair of grounding screws and a conductor, the pair of grounding screws threaded to the manifold body at opposite ends of the manifold body, one of the pair of grounding screws configured to contact the water conduit, the other of the pair of grounding screws configured to contact another water conduit, the conductor extending between the pair of grounding screws such that the pair of grounding screws are electrically coupled to each other with the conductor.

4. The water filter assembly of claim 3, wherein the conductor is encased within the manifold body.

5. The water filter assembly of claim 3, wherein the conductor is a metal conductor and the manifold body is a plastic manifold body, the metal conductor overmolded within the plastic manifold body.

6. The water filter assembly of claim 1, wherein the interface between the manifold body and the mounting clamp comprises a surface of the manifold body and a surface of the mounting clamp that face and are shaped complementary to each other.

7. The water filter assembly of claim 1, wherein the O-ring contacts the face seal at the interface between the manifold body and the mounting clamp.

8. A water filter assembly, comprising:
 a manifold mountable to a water conduit at a cutout of the water conduit, the water conduit having a pair of spaced ends at the cutout, the manifold mountable between the pair of spaced ends, the manifold comprising
  a manifold body;
  a first mounting clamp selectively mounted to the manifold body, one of the pair of spaced ends receivable between the manifold body and the first mounting clamp;
  a second mounting clamp selectively mounted to the manifold body, the other end of the pair of spaced ends receivable between the manifold body and the second mounting clamp;
  a plurality of fasteners for coupling the first and second mounting clamps to the manifold body;
  a first face seal extending along an interface between the manifold body and the first mounting clamp, the first face seal configured to be compressed between the manifold body and the first mounting clamp when one or more of the plurality of fasteners draws the manifold body and the first mounting clamp together;
  a second face seal extending along an interface between the manifold body and the second mounting clamp, the second face seal configured to be compressed between the manifold body and the second mounting clamp when one or more of the plurality of fasteners draws the manifold body and the second mounting clamp together; and a first O-ring positionable on the water conduit at the one end of the pair of spaced ends such that the first O-ring extends between an inner surface of the manifold body and an inner surface of the first mounting clamp; and a second O-ring positionable on the water conduit at the other end of the pair of spaced ends such that the second O-ring extends between the inner surface of the manifold body and an inner surface of the second mounting clamp; and a casing selectively mountable to the manifold, the casing sized for receipt of a filter media that filters water flowing through the manifold.

9. The water filter assembly of claim 8, wherein the plurality of fasteners is a plurality of screws, and either the manifold body or the first and second mounting clamps define a plurality of threaded holes for engaging with the plurality of screws.

10. The water filter assembly of claim 8, wherein the manifold further comprises a pair of grounding screws and a conductor, the pair of grounding screws threaded to the manifold body at opposite ends of the manifold body, one of the pair of grounding screws configured to contact the water conduit at the one end of the pair of spaced ends, the other of the pair of grounding screws configured to contact the water conduit at the other end of the pair of spaced ends, the conductor extending between the pair of grounding screws such that the pair of grounding screws are electrically coupled to each other with the conductor.

11. The water filter assembly of claim 10, wherein the conductor is encased within the manifold body.

12. The water filter assembly of claim 10, wherein the conductor is a metal conductor and the manifold body is a plastic manifold body, the metal conductor overmolded within the plastic manifold body.

13. The water filter assembly of claim 8, wherein the interface between the manifold body and the first mounting clamp comprises a first surface of the manifold body and a surface of the first mounting clamp that face and are shaped complementary to each other.

14. The water filter assembly of claim 13, wherein the interface between the manifold body and the second mounting clamp comprises a second surface of the manifold body and a surface of the second mounting clamp that face and are shaped complementary to each other.

15. The water filter assembly of claim 8, wherein the first O-ring contacts the first face seal at the interface between the manifold body and the first mounting clamp.

16. The water filter assembly of claim 15, wherein the second O-ring contacts the second face seal at the interface between the manifold body and the second mounting clamp.

17. The water filter assembly of claim 8, wherein the manifold body is sized such that the manifold body is configured to hang on the pair of spaced ends when the first and second mounting clamps are detached from the manifold body.

* * * * *